United States Patent
Haag et al.

(10) Patent No.: US 9,450,474 B2
(45) Date of Patent: Sep. 20, 2016

(54) ACTIVE COOLING OF A MOTOR

(71) Applicant: ebm-papst Mulfingen GmbH & Co. KG, Mulfingen (DE)

(72) Inventors: Christian Haag, Mulfingen (DE); Sven Walter, Bad Mergentheim-Rengershausen (DE); Bjoern Sudler, Boxberg-Schwabhausen (DE); Oliver Haaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 14/418,304

(22) PCT Filed: Jul. 17, 2013

(86) PCT No.: PCT/EP2013/065098
§ 371 (c)(1),
(2) Date: Mar. 11, 2015

(87) PCT Pub. No.: WO2014/019854
PCT Pub. Date: Feb. 6, 2014

(65) Prior Publication Data
US 2015/0188392 A1    Jul. 2, 2015

(30) Foreign Application Priority Data

Aug. 2, 2012 (DE) .................... 10 2012 107 107

(51) Int. Cl.
*H02K 9/06* (2006.01)
*H02K 5/18* (2006.01)
*H02K 5/20* (2006.01)
*H02K 9/14* (2006.01)

(52) U.S. Cl.
CPC ........ *H02K 9/06* (2013.01); *H02K 5/18* (2013.01); *H02K 5/20* (2013.01); *H02K 11/33* (2016.01); *H02K 9/14* (2013.01)

(58) Field of Classification Search
CPC ........ H02K 5/20; H02K 9/06; H02K 11/0073; H02K 5/18
USPC .............................. 310/62, 63, 89
See application file for complete search history.

(56) References Cited

U.S. PATENT DOCUMENTS

| 2,778,958 A | 10/1954 | Hamm et al. |
| 4,908,538 A * | 3/1990 | Geberth, Jr. ............. H02K 5/20 310/227 |

(Continued)

FOREIGN PATENT DOCUMENTS

| DE | 103 13 273 A1 | 10/2004 |
| EP | 2 405 561 A2 | 1/2012 |

OTHER PUBLICATIONS

International Search Report of PCT/EP2013/065098, mailed Jun. 25, 2014.

*Primary Examiner* — Naishadh Desai
(74) *Attorney, Agent, or Firm* — Collard & Roe, P.C.

(57) ABSTRACT

A motor, comprising an electronics housing, a stator having a stator bushing, and a rotor. The motor can be fastened to a fastening wall by means of the stator bushing. The motor according to the invention has an air conducting element and an air conveying element. The air conveying element is connected to the rotor in a rotationally fixed manner. The air conducting element surrounds the stator bushing and forms a flow space between the air conducting element and an outer circumference of the stator bushing. The flow space is open on the side of the electronics housing in the direction of the fastening wall through at least one flow gap. The air conducting element opens with an intake opening via a sealing gap in a rotor-side throughflow opening of the air conducting element.

10 Claims, 3 Drawing Sheets

(56) References Cited

U.S. PATENT DOCUMENTS

Figure 1:
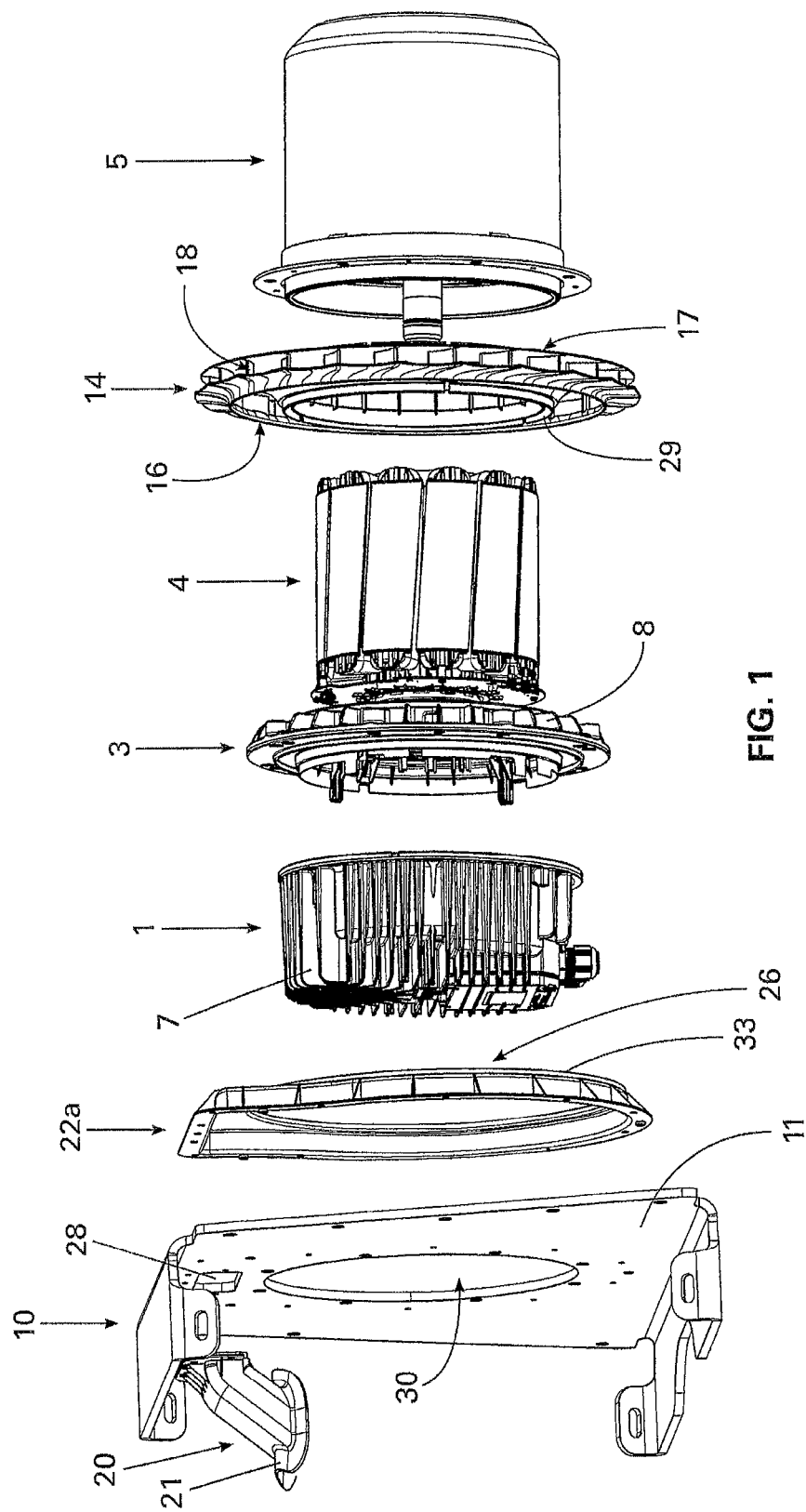

| | | | |
|---|---|---|---|
| 2005/0116554 A1* | 6/2005 | Dano | H02K 11/0073 310/58 |
| 2009/0028730 A1* | 1/2009 | Radermacher | F04D 29/4206 417/423.8 |
| 2011/0074235 A1* | 3/2011 | Leung | H02K 9/14 310/62 |
| 2011/0148230 A1* | 6/2011 | Knorr | H02K 1/2786 310/62 |
| 2012/0001505 A1 | 1/2012 | Henke et al. | |

* cited by examiner

ACTIVE COOLING OF A MOTOR

CROSS REFERENCE TO RELATED APPLICATIONS

This application is the National Stage of PCT/EP2013/065098 filed on Jul. 17, 2013, which claims priority under 35 U.S.C. §119 of German Application No. 10 2012 107 107.1 filed on Aug. 2, 2012, the disclosures of which are incorporated by reference. The international application under PCT article 21(2) was not published in English.

The invention relates to a motor comprising an electronics housing, a stator having a stator bushing, and a rotor, wherein the motor can be attached to an attachment wall with the stator bushing.

Such motors are particularly used for driving fans and have integrated electronics, particularly commutation electronics. The maximal power range of the motors is generally limited by the maximal component temperatures of the electronics, for example of the electrical power components, such as power amplifiers, or of the motor, for example of the motor winding or of the ball bearings. The lifetime of the motor is also dependent on the component temperatures reached during operation of the motor, whereby elevated temperatures shorten the lifetime of the motor.

The motors are particularly attached to a stable attachment wall, which is part of an installation housing, for example, into which the fan is installed. In this connection, the electronics housing is generally inserted into an installation opening of the attachment wall, and the motor is attached to the attachment wall by means of the stator bushing. Such attachment makes effective cooling of the motor and of the electronics more difficult, because flow around the motor and the electronics housing in the axial direction of the motor is hindered by the attachment wall. Furthermore, particularly in the case of radial fans, flow around the motor is poor or does not occur at all, due to the radial outflow of the air. In the case of axial fans, what is called a dead water area is formed in the region of the rotor bell, and this also has a negative influence on flow around the motor.

The invention is based on the task of creating a motor, the cooling of which is improved and the power and lifetime of which are increased, at the same ambient temperature.

In the case of a motor of the type described initially, this task is accomplished, according to the invention, in that the motor has an air guide element and an air-conveying element connected with the rotor in torque-proof manner, wherein the air guide element surrounds the stator bushing, and a flow space is formed between the air guide element and an outside circumference of the stator bushing, wherein the flow space is opened in the direction of the attachment wall, on the side of the electronics housing, by means of at least one flow gap, and the air-conveying element opens into a through-flow opening of the air guide element, with an intake opening through a sealing gap.

Such a motor allows active and targeted cooling of temperature-critical components of the motor, particularly of the motor electronics and of the ball bearing of the stator, by means of an air volume stream generated by the air-conveying element. The air volume stream is guided, in targeted manner, to the components of the motor that are particularly supposed to be cooled, particularly to the stator bushing and to the region of the electronics housing, using the air guide element and the flow gap of the flow space, and reinforces the cooling in comparison with passive cooling, by means of convection brought about by the conventional ambient air. In this way, increased power and a longer lifetime of the motor are made possible.

In a preferred embodiment of the motor, the air-conveying element is configured as a radial fan wheel. The radial fan wheel draws the air volume stream in axially and blows it out radially, so that the air volume stream can be generated in particularly effective manner and so as to flow parallel to the motor axis.

Depending on the embodiment of the motor, cooling of the electronics housing is more important than cooling of the stator bushing, or, in the case of a special application or installation situation, the ambient air has a lower temperature in the region of the electronics housing than in the region of the rotor.

In a first embodiment of the invention, the air guide element can be attached to the attachment wall and is disposed between the attachment wall and the air-conveying element, wherein the intake opening of the air-conveying element is oriented in the direction of the attachment wall. In this connection, the air-conveying element generates a partial vacuum in the region of its intake opening and of the opposite through-flow opening of the air guide element during motor operation. By means of the air guide element, an air volume stream is guided through a channel opening disposed in the attachment wall and through the flow gap, into the flow space and along the outside circumference surface of the stator bushing, all the way to the through-flow opening of the air guide element, and axially drawn in by the air-conveying element, from the direction of the attachment wall, at its intake opening, and radially blown out in the region of the rotor. In this embodiment of the invention, the air volume stream to be cooled is at first drawn in the region of the electronics housing, and thereby the electronics housing is cooled particularly strongly, and the cooling effect in general is improved.

Alternatively, cooling of the stator bushing is more important than cooling of the electronics housing, or, in a special application or installation situation, the ambient air in the region of the rotor has a lower ambient temperature than in the region of the electronics housing.

In a second embodiment of the motor, the air guide element can be attached to the attachment wall and the air-conveying element is disposed within the air guide element, wherein the intake opening of the air-conveying element is oriented to face away from the attachment wall. In this connection, the air-conveying element generates a partial vacuum in the region of its intake opening during motor operation, and axially draws in the air to be cooled, through the through-flow opening of the air guide element, from the direction that lies opposite to the attachment wall, in the region of the rotor, and blows it out radially into the flow space. An air volume stream is guided through the flow space and along the outside circumference surface of the stator bushing, through the flow gap and through the channel opening of the attachment wall, all the way to an outside circumference of the electronics housing, by means of the air guide element. In the alternative embodiment of the invention, the air volume stream to be cooled is drawn in on the rotor side and thereby the stator bushing is at first cooled particularly strongly, and the cooling effect is improved, in general.

In a further embodiment of the invention, the motor comprises an air guide channel disposed on the outside circumference of the electronics housing, which channel can be attached to the attachment wall, wherein the air guide channel runs from a channel opening in the attachment wall, disposed in the region of the flow space, to a region on the outside circumference of the electronics housing, which region is to be cooled.

Such a configuration of the motor allows active cooling of the electronics housing even in the case of installation on an attachment wall having an installation opening, without requiring significant modifications of existing motor types, because no modifications of the electronics housing or of the stator bushing are required. Depending on the installation situation, only an additional connection opening in the attachment wall, for connecting air guide channel and air guide element, needs to be provided, or an existing opening needs to be enlarged or adapted, so that the air guide channel and the air guide element can be sufficiently connected with one another.

In a further embodiment of the invention, the air guide channel has a ring-shaped circumferential projection on its end that lies against the outside circumference of the electronics housing, which projection is particularly adapted to the outside circumference progression of the electronics housing or of the housing cooling ribs, respectively.

The projection increases the size of the surface area of the electronics housing that is covered by the air guide channel and is thereby cooled by the air volume stream.

In a further embodiment of the invention, the air-conveying element has a funnel-shaped ring collar on the side of the air guide element, at the edge of the intake opening, and the air guide element has a circumferential ring groove on the side of the air-conveying element, at the edge of the through-flow opening, wherein the ring collar projects into the ring groove, and ring collar and ring groove form the sealing gap. This allows improved sealing, in terms of flow technology, between the intake opening of the air-conveying element and the through-flow opening of the air guide element.

Figure 2:
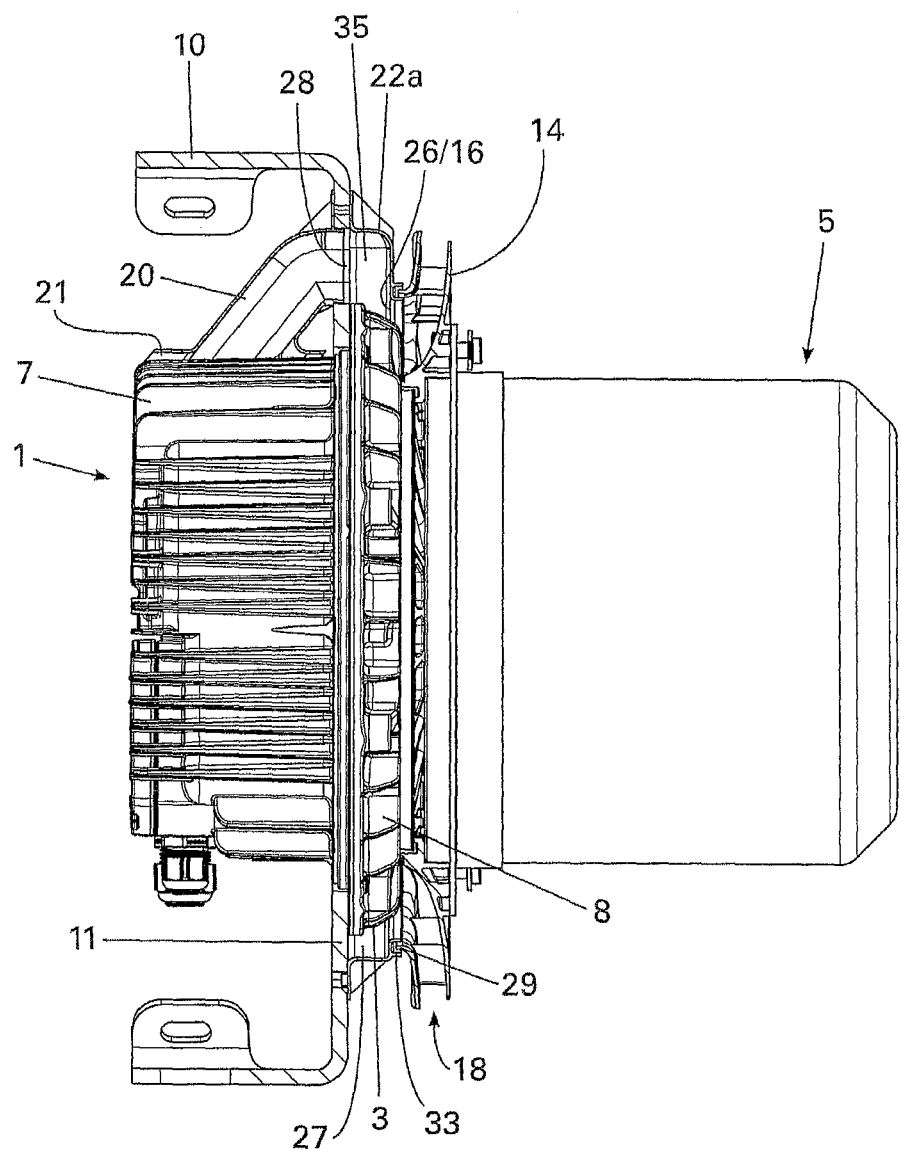
Figure 3:
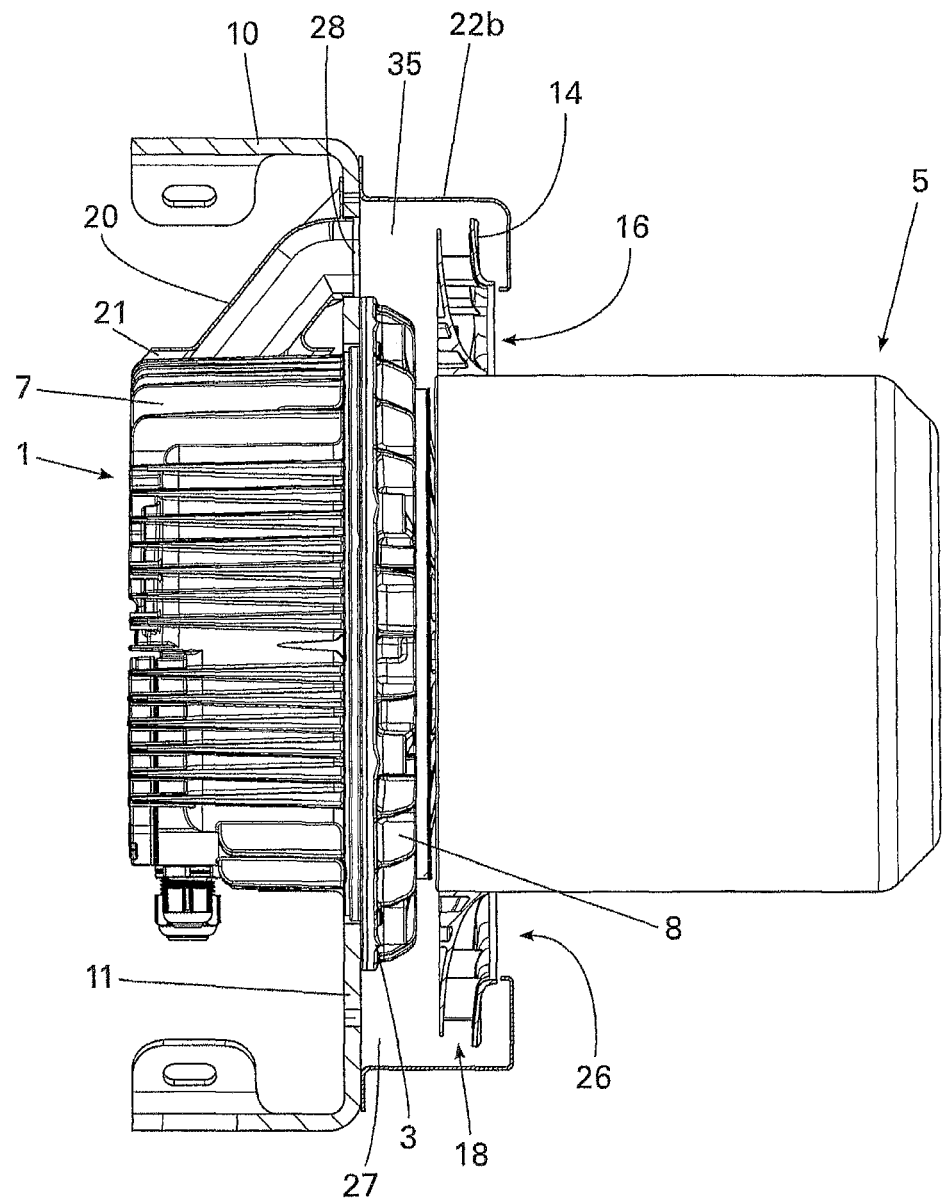

Further details, characteristics, and advantageous further developments of the invention are evident from the exemplary embodiments described below and shown in the drawings. The drawings show:

FIG. 1 a three-dimensional exploded drawing of a first embodiment of a motor according to the invention, with a support construction, FIG. 2 a side view of the first embodiment of a motor according to the invention, with a support construction, with a partial cross-section in the region of the air guide element and of the air guide channel, FIG. 3 a side view of a second embodiment of a motor according to the invention, with a support construction, with a partial cross-section in the region of the air guide element and of the air guide channel.

The same components are provided with the same reference symbols in all the figures.

FIG. 1, FIG. 2, and FIG. 3 each show a motor according to the invention, particularly an external rotor motor. The motor comprises an electronics housing 1, a stator comprising a stator bushing 3 and a laminated stator core 4 having motor windings, and a rotor 5, particularly an external rotor. The stator bushing 3 and the electronics housing 1 are particularly made of metal. In the electronics housing 1, there are motor electronics for drive and control of the motor, among other things, particularly commutation electronics having electrical power components such as power amplifiers. The electronics housing 1 has housing cooling ribs 7 on its outside wall, for cooling electronic components, not shown, within the electronics housing 1. The stator bushing 3 has stator cooling ribs 8 on its outside wall, which ribs run radially and conduct away the heat that is generated by the stator, particularly by ball bearings and motor windings, not shown, which are installed in the stator.

For attachment, the motor is particularly mounted on a supporting construction 10 or on an attachment wall 11 having an installation opening 30, by means of the stator bushing 3. In an embodiment of the invention, the attachment wall 11 can be part of a supporting construction 10 configured as a component of the motor, so that the supporting construction 10 forms the attachment wall 11. Alternatively, the attachment wall 11 can result from the installation situation, for example as a wall of an installation housing in which the motor is mounted. The motor is mounted in the installation opening 30 in such a manner that the electronics housing 1 is situated on the one side of the attachment wall 11, and the stator as well as the rotor 5 of the motor is situated on the other side of the attachment wall 11.

According to the invention, the motor has an air guide element 22a, 22b and an air-conveying element 14, both of which are configured in ring shape and surround the stator. In this connection, the air guide element 22a, 22b has a through-flow opening 26 on the side of the rotor 5. In the embodiment in FIG. 1 and FIG. 2, the diameter of the through-flow opening 26 is particularly configured in such a manner that both the electronics housing 1 and the stator bushing 3 can be inserted through the through-flow opening 26. This allows installation of the air guide element 22a on the attachment wall 11, independent of the motor. The air guide element 22a, 22b surrounds the stator in the region of the stator bushing 3, particularly in shell-like manner, and thereby a circumferential flow space 35 is formed between the air guide element 22a, 22b and an outside circumference of the stator bushing 3. The air guide element 22a, 22b and the air-conveying element 14 particularly consist of plastic. During operation of the motor, the air-conveying element 14 is driven by way of the motor. The air-conveying element 14 is particularly configured as a radial fan wheel and mounted on the stator so as to rotate, and connected with the rotor 5 in torque-proof manner. In this connection, a ring opening 17 of the air-conveying element 14 is covered by the rotor 5, on the rotor side. The air-conveying element 14 has a circumferential intake opening 16 that is open in the axial direction, which opening is connected, in terms of flow technology, in the interior of the air-conveying element 14, with a circumferential blow-out opening 18 that is open in the radial direction. The intake opening 16 of the air-conveying element 14 lies opposite to the through-flow opening 26 of the air guide element 22a, 22b, wherein the air-conveying element 14 opens into the axial through-flow opening 26 of the air guide element 22a, 22b with the axial intake opening 16, by way of a sealing gap. In this connection, it is particularly advantageous if the air-conveying element 14 has a funnel-shaped ring collar 29 on the side of the air guide element 22a, 22b, at the edge of a circumferential wall of the intake opening 16, and the air guide element 22a has a circumferential ring groove 33 on the side of the air-conveying element 14, at the edge of the through-flow opening 26, wherein the ring collar 29 projects into the ring groove 33, and ring collar 29 and ring groove 33 form the sealing gap. This allows optimization, in terms of flow technology, of the transition from the air guide element to the air-conveying element. The air-conveying element 14 is configured in such a manner that it generates a partial vacuum at its intake opening 16 during motor operation, and radially blows out an air volume stream at its blow-out opening 18.

On the side of the electronics housing 1, a circumferential flow gap 27 is formed between the air guide element 22a, 22b and the outside circumference edge of the stator bushing 3, so that the flow space 35 is open in the direction of the attachment wall 11 on the side of the electronics housing 1, wherein the flow gap 27 is axially covered, at least in part, in the installed state, by the attachment wall 11. In the region of the flow gap 27, the attachment wall 11 has at least one channel opening 28, which runs axially. At least one air guide channel 20 is disposed on the outside circumference of the electronics housing 1 on the side of the attachment wall 11 that lies opposite to the air guide element 22a, 22b, and runs from the channel opening 28 of the attachment wall 11, in the direction of at least one region of the electronics housing 1 that is to be cooled, on the outside circumference of the electronics housing 1. The air guide channel 20 can particularly be attached to the attachment wall 11 and is particularly made of plastic. The air guide channel 20 has a ring-shaped circumferential projection 21 on its end that lies against the outside circumference of the electronics housing 1, which projection is particularly adapted, in terms of shape, to the outside circumference progression of the electronics housing 1, particularly of the housing cooling ribs 7. As a result, the projection 21, together with the end of the air guide channel 20, covers a region of the housing cooling ribs 7, in terms of circumference, and forms multiple cooling channels that run between the housing cooling ribs 7.

In this embodiment of the motor, a selected region of the electronics housing 1, covered by the end of the air guide channel 20, is cooled in targeted manner. This is particularly the region in which the electronic components that must particularly be cooled are disposed in the interior of the electronics housing 1. It is also conceivable, however, to dispose multiple channel openings 28 in the attachment wall 11, in the region of the flow gap 27, distributed over the circumference of the motor, so that multiple air guide channels 20 cool multiple regions of the electronics housing 1.

In the first embodiment shown in FIG. 1 and FIG. 2, the air guide element 22a can be attached to the attachment wall 11 and is disposed between the attachment wall 11 and the air-conveying element 14, wherein the intake opening 16 of the air-conveying element 14 is oriented in the direction of the attachment wall 11. During motor operation, the air-conveying element 14 generates a partial vacuum in the region of its intake opening 16 and of the opposite through-flow opening 26 of the air guide element 22a. An air volume stream is drawn in by way of the flow space 35 and the air guide channel 20. In this connection, the air volume stream at first flows along the housing cooling ribs 7 of the electronics housing 1, wherein it absorbs heat from the electronics housing 1 or from the surface of the housing cooling ribs 7. As a result, the electronics housing 1 is cooled, thereby cooling specific electronic components to be cooled, which are disposed in the electronics housing 1. The projection 21 of the air guide channel 20 additionally increases the size of the intake path through the housing cooling ribs 7, and thereby reinforces the cooling effect. Afterward, the air volume stream flows through the air guide channel 20 and through the channel opening 28 of the attachment wall 11, and through the flow gap 27, into the flow space 35 and along the outside circumference surface of the stator bushing 3, all the way to the through-flow opening 26 of the air guide element 22a, and there is axially drawn in by the air-conveying element 14, at its intake opening 16, and radially blown out from the blow-out opening 18, in the region of the rotor 5. The air volume stream is distributed at the circumference of the stator bushing 3, by means of the circumferential flow space 35 and the circumferential intake opening 16 of the air-conveying element 14, and is particularly passed along the stator cooling ribs 8 of the stator bushing 3, where it absorbs heat from the stator and from the surface of the stator cooling ribs 8, respectively.

In the first embodiment of the invention, the air volume stream to be cooled is at first drawn in the region of the electronics housing 1 or through the air guide channel 20 on the outside circumference of the electronics housing 1. As a result, the air volume stream comes into contact with the electronics housing 1, at first, so that the electronics housing 1 is particularly strongly cooled. This is particularly advantageous if the ambient air has a lower temperature on the side of the electronics housing 1 than in the region of the rotor 5.

In the second embodiment shown in FIG. 3, the air guide element 22b can be attached to the attachment wall 11, and the air-conveying element 14 is disposed within the air guide element 22b, wherein the intake opening 16 of the air-conveying element 14 is oriented to face away from the attachment wall 11. The air guide element 22b also surrounds the air-conveying element 14. In comparison with the first embodiment, the air-conveying element 14 is rotated by 180°. As a result, the flow direction of the air volume stream changes. During motor operation, the air-conveying element 14 generates a partial vacuum in the region of its intake opening 16 and of the adjacent through-flow opening 26 of the air guide element 22b, and axially draws in the air in the region of the rotor 5, and radially blows out the air through the blow-out opening 18, into the flow space 35. As a result, an excess pressure is formed in the flow space 35, thereby causing the air volume stream to flow along the outside circumference surface of the stator bushing 3 and, in particular, along the stator cooling ribs 8, through the flow gap 27 and the channel opening 28 and the air guide channel 20, wherein it absorbs heat from the stator or from the surface of the stator cooling ribs 8, respectively, and cools the components of the stator. The air volume stream exits at the outside circumference of the electronics housing 1, at the end of the air guide channel 20, and is blown between the housing cooling ribs 7, thereby additionally cooling the electronics housing 1.

In the second embodiment of the invention, the cooling air volume stream is at first drawn in the region of the rotor 5. As a result, the air volume stream at first comes into contact with the stator, so that the stator is cooled particularly strongly. This is particularly advantageous if the ambient air has a lower temperature on the side of the rotor 5 than in the region of the electronics housing 1.

The invention is not restricted to the exemplary embodiments that are shown and described, but rather comprises all embodiments that have the same effect, in the sense of the invention. Furthermore, the invention is also not restricted to the combination of characteristics defined in each independent claim, until now, but rather can also be defined by any other desired combination of specific characteristics of all the individual characteristics disclosed in total. This means that fundamentally, practically any individual characteristic of the independent claim, in each instance, can be left out or replaced by at least one other individual characteristic disclosed at another point of the application. In this regard, the claims should be understood to be merely a first formulation attempt for the invention, in each instance.

The invention claimed is:

1. Motor comprising an electronics housing, a stator having a stator bushing, a rotor, and a ring-shaped air-conveying element connected with the rotor in torque-proof manner, wherein the motor can be attached to an attachment wall having an installation opening with the stator bushing, in such a manner that the electronics housing is situated on the One side of the attachment wall and the stator bushing as well as the rotor are situated on the other side of the attachment wall, and wherein the electronics housing has housing cooling ribs on the outside wall, and comprising
 a ring-shaped air guide element, wherein the air guide element surrounds the stator bushing, and a circumferential flow space is formed between the air guide element and an outside circumference of the stator bushing, wherein the electronics housing is inserted into the ring-shaped air guide element and extends through said ring-shaped air guide element and the installation opening in the attachment wall, wherein the flow space is open in the direction of the attachment wall, on the side of the electronics housing, by means of at least one flow gap, and the air-conveying element opens into a rotor-side circumferential through-flow opening of the air guide element, with a circumferential intake opening that is open in the axial direction through a sealing gap.

2. Motor according to claim 1, wherein the air-conveying element is configured as a radial fan wheel.

3. Motor according to claim 1, wherein the air guide element can be attached to the attachment wall and is disposed between the attachment wall and the air-conveying element, wherein the intake opening of the air-conveying element is oriented in the direction of the attachment wall.

4. Motor according to claim 1, wherein the air guide element can be attached to the attachment wall and the air-conveying element is disposed within the air guide element, wherein the intake opening of the air-conveying element is oriented to face away from the attachment wall.

5. Motor according to claim 1, comprising at least one air guide channel disposed on the outside circumference of the electronics housing, which channel can be attached to the attachment wall, wherein the air guide channel runs from at least one channel opening in the attachment wall, disposed in the region of the flow gap, to a region on the outside circumference of the electronics housing, which region is to be cooled.

6. Motor according to claim 5, comprising a support construction that forms the attachment wall, comprising an installation opening for accommodating the electronics housing, wherein the stator bushing and the air guide element are attached to the support construction, and wherein the channel opening preferably is disposed radially between the stator bushing and the air guide element, in the support construction.

7. Motor according to claim 5, wherein the housing cooling ribs are covered, in terms of circumference, by the air guide channel.

8. Motor according to claim 1, wherein the stator bushing has stator cooling ribs on its outside wall, which ribs are covered, in terms of circumference, by the air guide element.

9. Motor comprising an electronics housing, a stator having a stator bushing, a rotor, and a ring-shaped air-conveying element connected with the rotor in torque-proof manner, wherein the motor can be attached to an attachment wall having an installation opening with the stator bushing, in such a manner that the electronics housing is situated on the one side of the attachment wall and the stator as well as the rotor are situated on the other side of the attachment wall, and wherein the electronics housing has housing cooling ribs on the outside wall, comprising:
 a ring-shaped air guide element, wherein the air guide element surrounds the stator bushing, and a circumferential flow space is formed between the air guide element and an outside circumference of the stator bushing, wherein the flow space is open in the direction of the attachment wall, on the side of the electronics housing, by means of at least one flow gap, and the air-conveying element opens into a rotor-side circumferential through-flow opening of the air guide element, with a circumferential intake opening that is open in the axial direction through a sealing gap, and
 at least one air guide channel disposed on the outside circumference of the electronics housing, which channel can be attached to the attachment wall, wherein the air guide channel runs from at least one channel opening in the attachment wall, disposed in the region of the flow gap, to a region on the outside circumference of the electronics housing, which region is to be cooled,
 wherein the air guide channel has a ring-shaped circumferential projection on its end that lies against the outside circumference of the electronics housing, which projection is adapted, in terms of shape, to the outside circumference progression of the electronics housing.

10. Motor comprising an electronics housing, a stator having a stator bushing, a rotor, and a ring-shaped air-conveying element connected with the rotor in torque-proof manner, wherein the motor can be attached to an attachment wall having an installation opening with the stator bushing, in such a manner that the electronics housing is situated on the one side of the attachment wall and the stator as well as the rotor are situated on the other side of the attachment wall, and wherein the electronics housing has housing cooling ribs on the outside wall, comprising
 a ring-shaped air guide element, wherein the air guide element surrounds the stator bushing, and a circumferential flow space is formed between the air guide element and an outside circumference of the stator bushing, wherein the flow space is open in the direction of the attachment wall, on the side of the electronics housing, by means of at least one flow gap, and the air-conveying element opens into a rotor-side circumferential through-flow opening of the air guide element, with a circumferential intake opening that is open in the axial direction through a sealing gap,
 wherein the air-conveying element has a funnel-shaped ring collar on the side of the air guide element, at the edge of the intake opening, and the air guide element has a circumferential ring groove on the side of the air-conveying element, at the edge of the through-flow opening, wherein the ring collar projects into the ring groove, and ring collar and ring groove form the sealing gap.

* * * * *